US010333152B2

(12) United States Patent
Uchida et al.

(10) Patent No.: US 10,333,152 B2
(45) Date of Patent: Jun. 25, 2019

(54) FUEL CELL SYSTEM AND METHOD FOR ITS OPERATION

(71) Applicant: UNIVERSITY OF YAMANASHI, Yamanashi (JP)

(72) Inventors: Makoto Uchida, Yamanashi (JP); Katsuyoshi Kakinuma, Yamanashi (JP); Masahiro Watanabe, Yamanashi (JP); Akihiro Iiyama, Yamanashi (JP)

(73) Assignee: UNIVERSITY OF YAMANASHI, Yamanashi (JP)

( * ) Notice: Subject to any disclaimer, the term of this patent is extended or adjusted under 35 U.S.C. 154(b) by 204 days.

(21) Appl. No.: 15/234,688

(22) Filed: Aug. 11, 2016

(65) Prior Publication Data

US 2017/0047600 A1    Feb. 16, 2017

(30) Foreign Application Priority Data

Aug. 11, 2015   (JP) ................... 2015-159087

(51) Int. Cl.
| | |
|---|---|
| *H01M 8/04* | (2016.01) |
| *H01M 4/92* | (2006.01) |
| *H01M 8/04223* | (2016.01) |
| *H01M 8/04225* | (2016.01) |

(52) U.S. Cl.
CPC ....... *H01M 4/925* (2013.01); *H01M 8/04225* (2016.02); *H01M 8/04238* (2013.01)

(58) Field of Classification Search
CPC .................................................... H01M 8/04
See application file for complete search history.

(56) References Cited

U.S. PATENT DOCUMENTS

| | | | |
|---|---|---|---|
| 2003/0134164 A1* | 7/2003 | Reiser | H01M 8/04223 429/415 |
| 2007/0015016 A1 | 1/2007 | Aoyama et al. | |
| 2010/0310955 A1* | 12/2010 | Yadha | H01M 8/04231 429/429 |

(Continued)

FOREIGN PATENT DOCUMENTS

| | | |
|---|---|---|
| JP | 2004-146084 A | 5/2004 |
| JP | 2005-11654 A | 1/2005 |

(Continued)

OTHER PUBLICATIONS

Office Action dated Apr. 23, 2019 in corresponding Japanese Application No. 2015-159087; 6 pages including English-language translation.

*Primary Examiner* — Jacob B Marks
(74) *Attorney, Agent, or Firm* — Maier & Maier, PLLC (57) ABSTRACT

A fuel cell system and a method of operating the same is provided that is capable of reducing degradation of a cathode catalyst of a fuel cell. A fuel cell system is provided that includes a fuel cell having a catalyst used for an anode, wherein a carrier of the catalyst is composed of a material with a property where electric resistance in an oxygen containing atmosphere is greater than electric resistance in a hydrogen atmosphere; and a control device configured to control the fuel cell, when supply of fuel gas is stopped during stoppage of operation of the fuel cell, to consume all or part of the fuel gas in a fuel gas chamber, followed by introducing oxygen containing gas into the fuel gas chamber.

9 Claims, 7 Drawing Sheets

(56) References Cited

U.S. PATENT DOCUMENTS

| | | | | |
|---|---|---|---|---|
| 2011/0151354 A1* | 6/2011 | Jin | ..................... | H01M 4/8842 |
| | | | | 429/489 |
| 2012/0015284 A1* | 1/2012 | Merzougui | .............. | B01J 21/18 |
| | | | | 429/520 |
| 2014/0000444 A1 | 1/2014 | Kaneko | | |

FOREIGN PATENT DOCUMENTS

| | | | |
|---|---|---|---|
| JP | 2006-120385 A | 5/2006 | |
| JP | 2006-244907 A | 9/2006 | |
| JP | 2013-540050 A | 10/2013 | |
| WO | 2005/043663 A1 | 5/2005 | |

* cited by examiner

Fig. 3A. CHEMICAL REACTION AND ELECTRIC RESISTANCE

Fig. 3B. IN HYDROGEN ATMOSPHERE

Fig. 3C. IN OXYGEN ATMOSPHERE

Fig.4

Fig.6

FUEL CELL SYSTEM AND METHOD FOR ITS OPERATION

TECHNICAL FIELD

The present invention relates to a fuel cell system and a method of operating the same.

BACKGROUND ART

In a solid polymer fuel cell using a polymer electrolyte membrane, supply of fuel gas and oxidation gas to the fuel cell is stopped to terminate operation of the fuel cell. For this procedure, there is a method to purge a fuel gas chamber with air.

For example, PTL 1 discloses a fuel cell system that requires no nitrogen facility by a purging operation with air and is excellent in operability and convenience.

CITATION LIST

Patent Literature

PTL 1: JP 2004-146084A

SUMMARY OF INVENTION

Technical Problem

However, when fuel gas is supplied to a fuel gas channel for restarting the fuel cell from the state where the fuel chamber is purged with air, the fuel gas is filled from an upstream side of the fuel gas channel and air sometimes remains in a downstream portion of the fuel gas channel. Due to the chemical reaction that occurs on the downstream side of the fuel gas channel with the residual air, a cathode catalyst is degraded. Such degradation is explained below with reference to FIG. 1.

Figure 1:
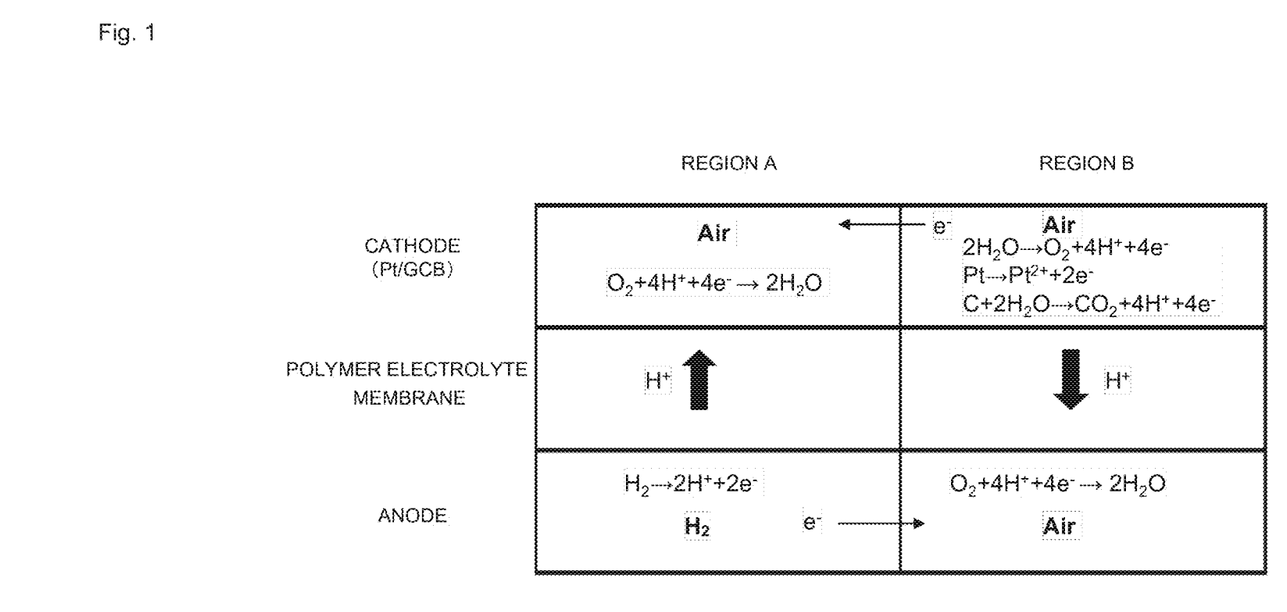
FIG. 1 is an illustration of chemical reaction in a hydrogen atmosphere and an oxygen atmosphere of a conventional fuel cell.

FIG. 1 is an illustration of chemical reaction in a hydrogen atmosphere and an oxygen atmosphere. A region A in FIG. 1 indicates a region in the hydrogen atmosphere where fuel gas is present in the anode and a region in the oxygen atmosphere where air is present in the cathode, and a region B indicates a region in the oxygen atmosphere where air is present in the anode and the cathode. In the region A, a reaction of "$H_2 \to 2H^+ + 2e^-$" occurs in the anode to produce protons $H^+$ and electrons $e^-$. The protons $H^+$ move to the cathode through the polymer electrolyte membrane. Then, in the cathode, the protons $H^+$ moved from the anode and electrons $e^-$ produced by a corrosion reaction, described below, occurred in the region B of the cathode and moved from the region B of the cathode form a reaction of "$O_2 + 4H^+ + 4e^- \to 2H_2O$" to produce water.

Then, chemical reaction in the region B is described. Generally, a Pt/C catalyst with platinum microparticles supported by a carbon carrier is used for a cathode of a solid polymer fuel cell. The Pt/C catalyst is extremely active to oxidation reaction with $H_2$ and the reaction of "$H_2 \to 2H^+ + 2e^-$" occurs in the region A of the anode. Therefore, in the regions A and B, the electrons $e^-$ uniformly propagate through a carbon substrate (catalyst layer, gas diffusion layer) constituting the anode, and both regions have equally high electron density (equal electric potential) to induce the reaction of "$O_2 + 4H^+ + 4e^- \to 2H_2O$" with the oxygen remaining in the region B of the anode. However, in-plane transfer resistance of the protons $H^+$ from the region A, which is a catalyst layer containing the polymer electrolyte membrane composed of a thin layer in micron order, to the region B is several digits more than transfer resistance, vertical to the former, in the membrane thickness direction of the polymer electrolyte membrane (direction via the polymer electrolyte membrane), and thus the movement of the protons $H^+$ between the regions A and B is limited. As a result, lack of the protons $H^+$ occurs in the region B of the anode. To compensate for the lack, undesired reactions of "$Pt \to Pt^{2+} + 2e^-$" and "$C + 2H_2O \to CO_2 + 4H^+ + 4e^-$", which are corrosion reactions of the catalyst and the catalyst carrier, occur in the region B of the cathode to produce protons $H^+$ and electrons $e^-$. These protons $H^+$ move to the region B of the anode through the polymer electrolyte membrane to be used for "$O_2 + 4H^+ + 4e^- \to 2H_2O$" in the region B of the anode. The movement of the protons $H^+$ occurred by such corrosion reaction in the cathode is referred to as "a reverse current", meaning a flow in a direction opposite to the original intention.

As just described, when air enters the fuel gas channel, the above chemical reaction progress to corrode platinum (Pt) and carbon (C) as the catalyst materials for the cathode, resulting in degradation of the performances as the catalyst.

Such degradation similarly occurs in a method of confining hydrogen by, without purging the fuel chamber with air, sealing the fuel gas channel when the fuel cell is stopped. The reason is as follows. Firstly, the fuel gas remained in the anode and the air in the cathode diffuse to each other via the polymer electrolyte membrane for reaction of the fuel gas and the air, causing consumption of the fuel gas. Then, in the anode, the pressure in the system gradually decreases even with the valve particularly closed due to the reaction between the fuel gas and the air and leakage from the valve. When the pressure in the anode system decreases, the air enters the fuel gas channel through the polymer electrolyte membrane from the oxidation gas channel.

It is thus difficult to completely prevent mixing of air into the fuel chamber, and as a result, the degradation of the cathode catalyst due to the reverse current generated at the start of the fuel cell has been inevitable.

The present invention has been made in view of such circumstances, and it is to provide a fuel cell system and a method of operating the same that are capable of reducing degradation of a cathode catalyst in a fuel cell.

Solution to Problem

According to the present invention, a fuel cell system is provided that includes: a fuel cell having a catalyst used for an anode, wherein a carrier of the catalyst is composed of a material with a property where electric resistance in an oxygen containing atmosphere is greater than electric resistance in a hydrogen atmosphere; and a control device configured to control the fuel cell, when supply of fuel gas is stopped during stoppage of operation of the fuel cell, to consume all or part of the fuel gas in a fuel gas chamber, followed by introducing oxygen containing gas into the fuel gas chamber.

According to the present invention, even when fuel gas in a fuel gas chamber is substituted by air during stoppage of operation of the fuel cell, by using, as an anode, a catalyst having a carrier of a material with a property where electric resistance in an oxygen containing atmosphere is greater than electric resistance in a hydrogen atmosphere, it is possible to inhibit generation of a reverse current and to reduce degradation of a catalyst used for a cathode.

Various embodiments of the present invention are shown below as examples. The embodiments below may be combined with each other.

It is preferred that the fuel cell further includes a valve provided in a channel in communication with the fuel gas chamber and open to atmosphere, wherein air as the oxygen containing gas is controlled to be introduced into the fuel gas chamber by opening the valve by the control device when a pressure in the fuel gas chamber is lower than an atmospheric pressure.

It is preferred that the control device configured to control the air, by opening the valve when the fuel cell is restarted, to be pushed out with the fuel gas introduced into the fuel gas chamber for discharge of the air to the atmosphere.

It is preferred that the control device configured to control, when an air concentration in gas passing through the channel open to the atmosphere is less than a predetermined value after the fuel cell is restarted, the valve to be closed to start power generation.

It is preferred that the control device configured to control, when a hydrogen concentration in gas passing through the channel open to the atmosphere is more than a predetermined value after the fuel cell is restarted, the valve to be closed.

It is preferred that the channel in communication with the fuel gas chamber and open to atmosphere is connected to a branched channel provided across both sides of the valve and the branched channel is provided with a check valve to prevent outflow of gas towards the atmosphere from the fuel gas chamber.

It is preferred that the material is any one of metal oxide, metal nitride, and metal carbide doped with an impurity having a valence greater than a valence of metal constituting a metal compound subjected to doping.

It is preferred that a fuel cell system is provided that includes: a fuel cell having a catalyst used for a cathode, wherein a carrier of the catalyst is composed of metal oxide doped with an impurity having a valence greater than a valence of metal constituting metal oxide subjected to doping; and a control device configured to control the fuel cell, when supply of fuel gas is stopped during stoppage of operation of the fuel cell, to consume all or part of the fuel gas in a fuel gas chamber, followed by introducing oxygen containing gas into the fuel gas chamber.

It is preferred that the metal oxide is at least one selected from tin oxide, titanium oxide, tungsten oxide, indium oxide, vanadium oxide, and perovskite oxide.

It is preferred that a method of operating a fuel cell system is provided that includes: controlling, when supply of fuel gas is stopped during stoppage of operation of a fuel cell the fuel cell to consume all or part of the fuel gas in a fuel gas chamber, followed by introducing oxygen containing gas into the fuel gas chamber, wherein the fuel cell has a catalyst used for an anode, and a carrier of the catalyst is composed of a material with a property where electric resistance in an oxygen containing atmosphere is greater than electric resistance in a hydrogen atmosphere.

BRIEF DESCRIPTION OF DRAWINGS

FIGS. 3A to 3C are illustration of chemical reaction and electric resistance of an anode in a hydrogen atmosphere and an oxygen atmosphere, where FIG. 3A illustrates chemical reaction and electric resistance.

DESCRIPTION OF EMBODIMENTS

Now, embodiments of the present invention will be described with reference to the drawings. Various features in the embodiments described below may be combined with each other. Respective features independently constitute inventions.

<Catalyst Used for Anode>

As a catalyst used for an anode, a catalyst is used that has a carrier of a material with properties where electric resistance in an oxygen containing atmosphere is greater than electric resistance in a hydrogen atmosphere. Examples of such catalyst include a catalyst having a carrier of conductive ceramics disclosed in Journal of Power Sources, Volume 294, 30 Oct. 2015, Pages 292-298. This catalyst is specifically a catalyst with noble metal and/or noble metal alloy supported by a conductive ceramics carrier. As the conductive ceramics, metal oxide is used, and among all, from the perspective of chemical and electrochemical stability, titanium containing conductive ceramics is preferred.

Further, to increase the conductivity of the conductive ceramics, the conductive ceramics may be doped with dissimilar metal (dopant). As the dopant, for example, niobium (Nb), tantalum (Ta), antimony (Sb), chromium (Cr), molybdenum (Mo), and tungsten (W) may be used.

As the noble metal used for the catalyst, for example, platinum (Pt), ruthenium (Ru), palladium (Pd), iridium (Ir), silver (Ag), and gold (au) may be used. In particular, platinum and platinum alloy are preferred. Such catalyst is referred below to as "a ceramics catalyst".

For the anode, a catalyst with a carrier of metal oxide doped with an impurity having a valence greater than a valence of metal constituting metal oxide subjected to doping, for example, a catalyst with a carrier of Pt/Nb—$TiO_2$, Pt/Ta—$TiO_2$, or instead of such oxide, nitride or carbide that is doped in a similar manner as above. Examples of the nitride include TiN, SnN, $Sn_3N_4$, and the like, and examples of the carbide include TiC, WC, $W_2C$, and the like.

Figure 2:
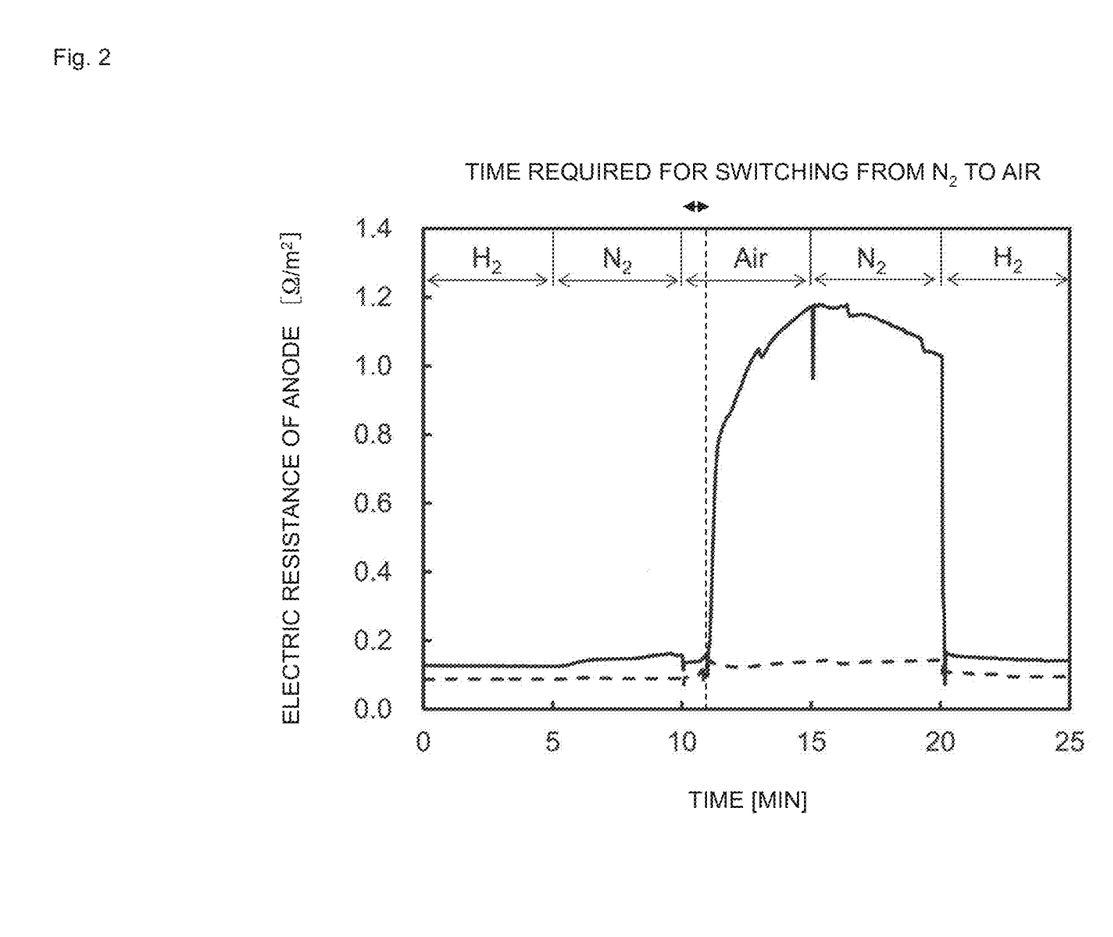
FIG. 2 is an illustration of the variation of electric resistance of an anode in a hydrogen atmosphere and an oxygen atmosphere.

Here, a description is given to "atmospheric resistive switching mechanism: ARSM" of the ceramics catalyst. FIG. 2 is an illustration of the variation of electric resistance of the anode in various types of atmospheric gas when tantalum-doped titanium oxide (Pt/$Ti_{0.9}Ta_{0.1}O_{2-\delta}$) is used as the ceramics catalyst. In FIG. 2, the solid line represents $Ti_{0.9}Ta_{0.1}O_{2-\delta}$, and the broken line represents a conventional Pt/CB catalyst (Pt-supported carbon black carrier catalyst). The horizontal axis represents time, and the vertical axis represents electric resistance of the anode.

When the atmospheric gas is switched from $H_2$ to $N_2$, only negligible increase in resistance is found and $N_2$ is determined not to affect the electric resistance. Then, when it is switched from $N_2$ to air ($O_2$), the electric resistance rapidly increases and high atmosphere dependence is exhibited. This is considered because $O_2$ is adsorbed on the surface of the $Ti_{0.9}Ta_{0.1}O_{2-\delta}$ catalyst and a depletion layer is formed on the surface of the ceramics carrier. The electric resistance in the oxygen atmosphere at this point is approximately 9 times the electric resistance in the hydrogen atmosphere. Such rapid variation of electric resistance is referred to as ARSM (abbreviation of atmospheric resistive switching mechanism).

The ARSM effect is also developed in the catalyst having a carrier of metal nitride or metal carbide doped with an impurity having a valence greater than a valence of metal constituting a metal compound subjected to doping. This is because the nitride or carbide is oxidized in the oxygen atmosphere and an oxide coating layer is formed on the catalyst surface, so that such oxide coating layer acts in a similar manner to the oxide used for the ceramics catalyst. The oxide coating layer in several nanometer order influences the catalytic activity.

Then, even when the atmospheric gas is switched from this state to $N_2$, the electric resistance shows almost no variation. This is considered because, even when $N_2$ is introduced, it has almost no influence on $O_2$ already adsorbed and thus the depletion layer formed in the ceramics carrier is maintained.

Then, when the atmospheric gas is switched from this state again to $H_2$, the electric resistance immediately returns to the extent equivalent to the initial state. This is considered because $H_2$ thus introduced reacts with $O_2$ adsorbed by the ceramics carrier and thus $O_2$ is immediately removed from the ceramics carrier, so that the depletion layer formed in the ceramics carrier disappears.

In contrast, in the conventional catalyst Pt/CB, the carbon carrier adsorbs almost no $O_2$ and the atmosphere dependence of the electric resistance is low.

<Reduction in Degradation of Cathode Catalyst>

Figure 3A:
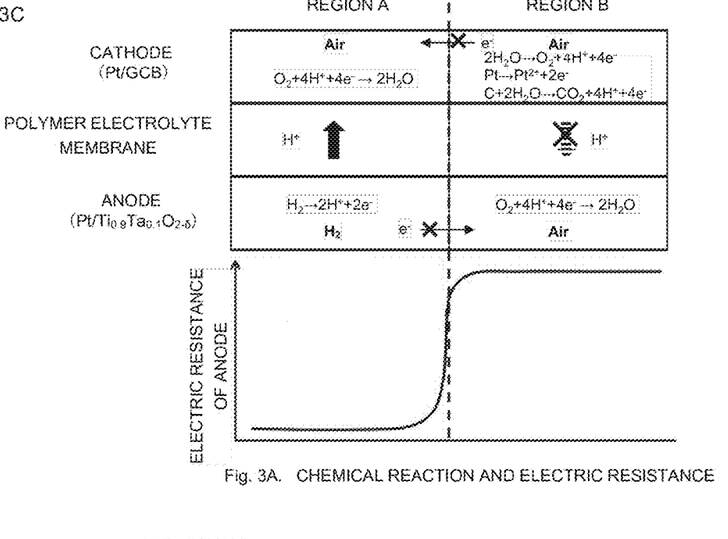
Figures 3B, 3C:
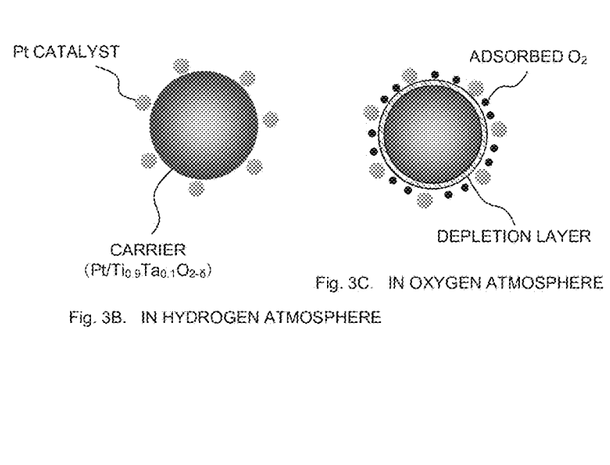
FIG. 3B is a schematic illustration of an anode catalyst in a hydrogen atmosphere.
FIG. 3C is a schematic illustration of an anode catalyst in an oxygen atmosphere.

Then, with reference to FIGS. 3A to 3C, a description is given to the reduction in degradation of the cathode catalyst by using a ceramics catalyst for the anode. In a fuel cell not using a ceramics catalyst, as illustrated in FIG. 1, $e^-$ moves between the region A and the region B in the anode and the cathode. In addition to the reaction of "$O_2+4H^++4e^- \rightarrow 2H_2O$" in the anode, corrosion reactions "$C+2H_2O \rightarrow CO_2+4H^++4e^-$" and "$Pt \rightarrow Pt^{2+}+2e^-$" in the cathode occur in parallel as counterparts of the reaction in the anode, and as a result, a reverse current is generated. In contrast, FIGS. 3A to 3C are illustrations of chemical reaction and electric resistance of the anode in a hydrogen atmosphere and an oxygen atmosphere when a ceramics catalyst is used, where FIG. 3A illustrates chemical reaction and electric resistance, FIG. 3B is a schematic illustration of a ceramics catalyst in a hydrogen atmosphere, and FIG. 3C is a schematic illustration of a ceramics catalyst in an oxygen atmosphere. From the boundary between the regions A and B, the electric resistance of the ceramics catalyst in the region B increases by ARSM and the movement of $e^-$ from the region A to the region B in the anode is disturbed. As a result, the reaction of "$O_2+4H^++4e^- \rightarrow 2H_2O$" in the region B of the anode is inhibited, and the corrosion reaction in the cathode is also inhibited as a counterpart of such reaction and a reverse current is not generated.

In such a manner, prevention of generation of a reverse current by ARSM of the ceramics catalyst enables reduction in degradation of the cathode catalyst.

First Embodiment

<Configuration of Fuel Cell System>

Figure 4:
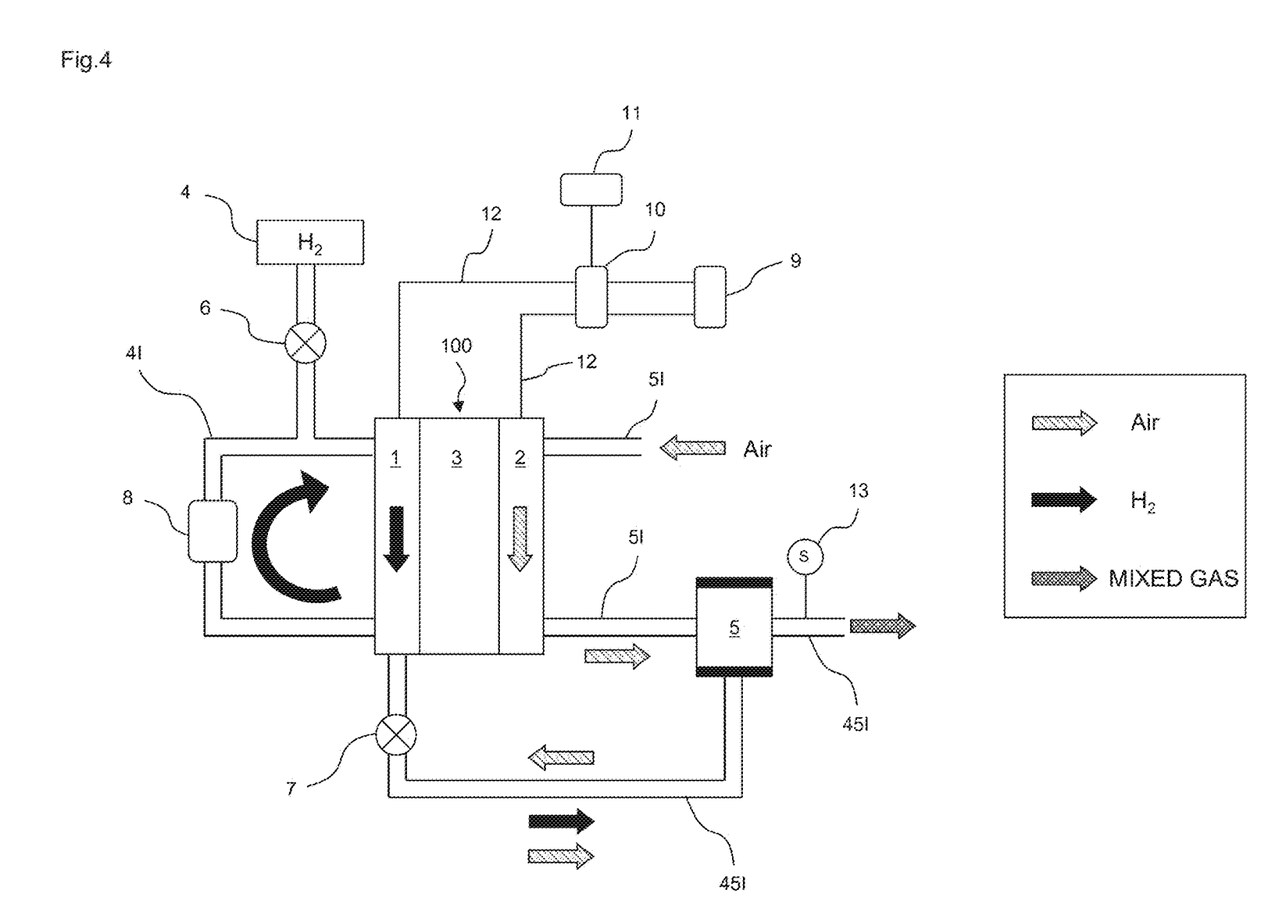
FIG. 4 is a block diagram illustrating a configuration of a fuel cell system according to a first embodiment.

With reference to FIG. 4, a description is given to a system to operate a fuel cell using a ceramics catalyst according to the first embodiment for the anode and using a Pt/CB catalyst for the cathode. The fuel cell system is provided with a fuel cell 100, a hydrogen tank 4, a buffer tank 5, and a battery 9.

In the fuel cell 100, a polymer electrolyte membrane 3 is sandwiched by an anode 1 provided with a fuel gas chamber (not shown) and a cathode 2 provided with an oxidation gas chamber (not shown). Here, the fuel gas chamber is a channel of fuel gas in the anode 1, and the oxidation gas chamber is a channel of oxidation gas in the cathode 2. Hereinafter, the anode 1 is regarded to include the fuel gas chamber and the cathode 2 is regarded to include the oxidation gas chamber. A ceramics catalyst is used for the anode 1, and a Pt/CB catalyst is used for the cathode 2. Then, by supplying the fuel gas to the anode 1 and the oxidation gas to the cathode 2, the protons move from the anode 1 to the cathode 2 via the polymer electrolyte membrane 3 to produce electric power. The polymer electrolyte membrane 3 is formed from a material exhibiting good electric conductivity in the wet state, and for example, a proton (ion) conductive ion exchange membrane formed by a fluorine-based resin is used. The fuel gas is supplied to the anode 1 from the hydrogen tank 4 described later, and air as the oxidation gas is supplied to the cathode 2 from an oxygen channel 5I open to atmosphere.

The hydrogen tank 4 stores fuel gas containing hydrogen (hereinafter, referred to as hydrogen) to supply the hydrogen to the anode 1. The hydrogen tank 4 and the anode 1 are connected by a hydrogen channel 41, and the hydrogen channel 41 is provided with an open/close hydrogen supply valve 6 and a circulation pump 8. The circulation pump 8 makes recirculation not to consume too much and dispose of hydrogen during operation of the fuel cell, and securely discharges the gas in the anode 1 and the hydrogen channel 41 when restarted.

The buffer tank 5 is connected to the cathode 2 via the oxygen channel 5I, connected to the anode 1 via a mixed gas channel 45I, and connected to a mixed gas channel 45I open to atmosphere. The mixed gas channel 45I connecting the buffer tank 5 with the anode 1 is provided with an open/close purge valve 7, and the mixed gas channel 45I open to atmosphere is provided with a sensor 13. The buffer tank 5 acts as, in addition to prevention of flow of gas at a high pressure into the cathode 2 when the fuel cell 100 is restarted, dilution of the concentration of hydrogen discharged outside. The "open and close" operations of the purge valve 7 as a purge operation required during normal operation are not mentioned here.

The sensor 13 acquires the hydrogen concentration in the gas passing through the mixed gas channel 45I, and for example, a concentration sensor, a pressure sensor, a voltmeter, an ammeter, and the like may be used.

The battery 9 is electrically connected to the anode 1 and the cathode 2 via wiring 12, and the wiring 12 is provided with a switch 10 to turn on/off electrical connection of the battery 9 to the anode 1 and the cathode 2. When the battery 9 is not charged during operation of the fuel cell 100, the switch 10 is in an off-state. When the supply of hydrogen to the anode 1 is stopped by an operation stop command of the fuel cell 100, the switch 10 is turned into an on-state to conduct between the battery 9 and the anode 1 and between the battery 9 and the cathode 2 to promote protonation of the hydrogen remained in the anode 1, thereby consuming the hydrogen in the anode 1. A CPU 11 functions as a control unit to receive a signal from the sensor 13, measure time, and output an open/close command for the hydrogen supply valve 6 and the purge valve 7. The turning on/off of the switch 10 during operation of the fuel cell 100 is performed by diagnosing, by the CPU 11, the necessity for charging power generated by the fuel cell to the battery 9.

<Sequence for Operation Stop Command and Restart>

Figure 5:
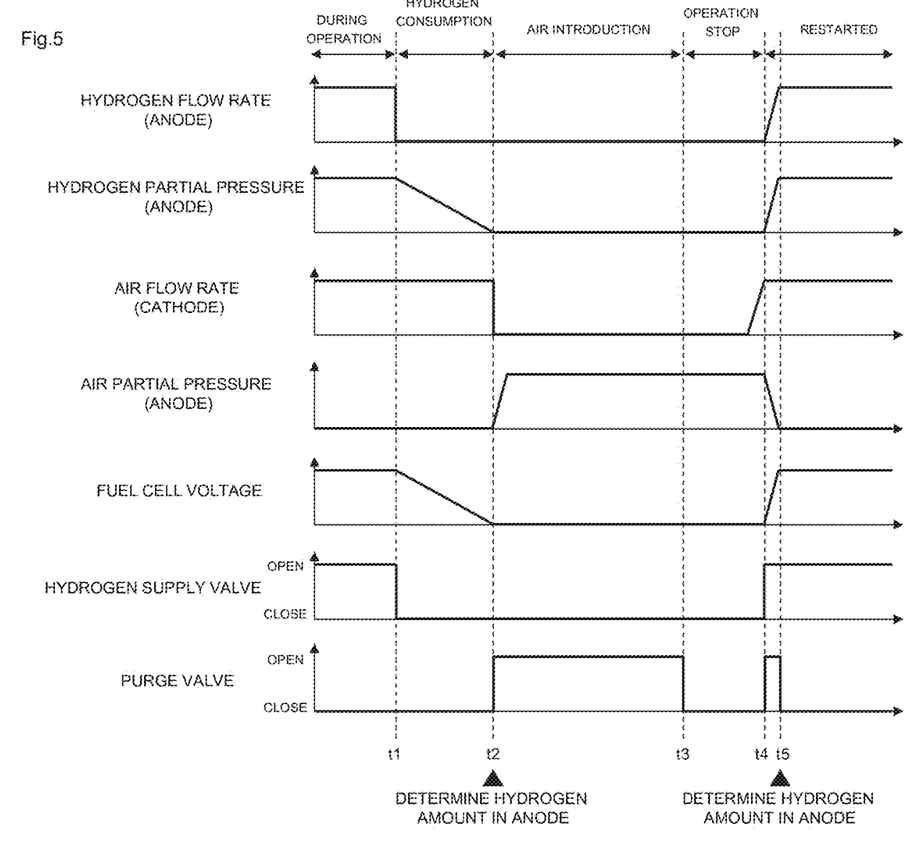
FIG. 5 is a sequence diagram during introduction of air into a fuel cell system according to the first embodiment.

With reference to FIG. 5, control for an operation stop command and restart of the fuel cell system is described. FIG. 5 is a conceptual diagram illustrating a hydrogen flow rate in the anode 1, a partial pressure of hydrogen and a partial pressure of air, an air flow rate in the cathode 2, a voltage in the fuel cell 100, and open/close timing of the hydrogen supply valve 6 and the purge valve 7. Since the cathode 2 is open to atmosphere and the partial pressure of air near the outlet of the cathode 2 is equal to the atmospheric pressure and rarely varies, the cathode 2 is omitted from the illustration.

During operation of the fuel cell 100, the hydrogen supply valve 6 is opened to supply hydrogen from the hydrogen tank 4 to the anode 1. In this state, the hydrogen flow rate and the partial pressure of hydrogen in the anode 1 are approximately constant. To the cathode 2, air as the oxygen containing gas is supplied from atmosphere, and the air flow rate in the cathode 2 is approximately constant. In this state, the voltage in the fuel cell 100 is approximately constant. Here, the purge valve 7 is in the closed state.

Then, an operation stop command of the fuel cell 100 is assumed to be issued at time t1. At this point, the hydrogen supply valve 6 is closed to stop the supply of hydrogen to the anode 1 and also the switch 10 is turned into an on-state to turn on electrical connection of the battery 9 to the anode 1 and the cathode 2. This results in consumption of the hydrogen remained in the anode 1 and the electrons move to the battery 9 via the wiring 12, and thus the battery 9 stores electricity. Accordingly, the partial pressure of hydrogen in the anode 1 and the voltage in the fuel cell 100 are reduced gradually. Although FIG. 5 shows linear reduction for the convenience of illustration, actual reduction may not be linear as such.

Then, at the time when the hydrogen concentration in the anode 1 may be substantially assumed to be 0 (t2), the purge valve 7 is opened to start introduction of air into the anode 1. Such concentration is determined from the time when the voltage in the fuel cell 100 decreases to a predetermined threshold, when the quantity of electricity charged to the battery 9 reaches a predetermined quantity of electricity, or when it reaches empirically determined charging time, and the like. The time t2 may be the time when all or part of the hydrogen in the anode 1 is consumed. The pressure in the anode 1 when part of the hydrogen in the anode 1 is consumed is, based on 1 atm at the atmospheric pressure, preferably from 0.001 to 0.7 atm, for example. It is more preferably from 0.005 to 0.5 atm. It is even more preferably from 0.01 to 0.3 atm. Specific examples include 0.001, 0.002, 0.003, 0.004, 0.005, 0.006, 0.007, 0.008, 0.009, 0.01, 0.02, 0.03, 0.04, 0.05, 0.06, 0.07, 0.08, 0.09, 0.1, 0.15, 0.2, 0.25, 0.3, 0.4, 0.5, 0.6, and 0.7 atm, and may be within a range between any two values listed here. In this state, the pressure in the anode 1 is lower than the atmospheric pressure (negative pressure), so that air spontaneously flows into the anode 1 by opening the purge valve 7, enabling the anode 1 to be filled with air within one or several seconds. The hydrogen concentration does not have to be acquired from the voltage or the charged quantity of electricity. The temporal variation of the concentration of the hydrogen remained in the anode 1 is obtained from the volume of the hydrogen channel 41 and the charging time that are set in advance to calculate the time ($t_x$) taken for making the hydrogen concentration in the anode 1 to be substantially 0, and thus introduction of air into the anode 1 may be started after the lapse of $t_x$ from t1.

After a certain time from the introduction of air, at time t3, the operation of the fuel cell is stopped. In this state, the purge valve 7 is closed to confine the air in the anode 1, so that the partial pressure of air in the anode 1 is approximately constant. In the present embodiment, since the use of a ceramics catalyst as the catalyst for the anode 1 enables inhibition of the generation of a reverse current due to ARSM described above, it is possible to reduce degradation of the Pt/CB catalyst used for the cathode 2.

The case of restarting the fuel cell 100 at time t4 is described. Firstly, assume that introduction of air into the cathode 2 is started and the flow rate reached a certain rate. At this point (t4), the hydrogen supply valve 6 and the purge valve 7 are opened to substitute the air in the anode 1 by hydrogen. In this state, mixed gas of the pushed out air and the supplied hydrogen is delivered to the buffer tank 5 through the mixed gas channel 45I to alleviate the pressure of the mixed gas and also dilute the hydrogen concentration. Then, the mixed gas is discharged to atmosphere through the mixed gas channel 45I. The hydrogen concentration in the mixed gas is substantially 0 immediately after the hydrogen supply valve 6 is opened, whereas the hydrogen concentration is increased by pushing out the air in the anode 1. If the hydrogen concentration of the mixed gas exceeds 4%, there is a possibility of combustion or explosion where there is a source of ignition. Therefore, at the time (t5) when the hydrogen concentration acquired by the sensor 13 exceeds, for example, 3.8%, the purge valve 7 is closed to confine hydrogen in the anode 1 and the hydrogen channel 41. As described above, the hydrogen concentration does not have to be acquired by the sensor 13. The temporal variation of the concentration of the hydrogen in the anode 1 is obtained from the volume of the hydrogen channel 41 and the charging time that are set in advance to calculate the time ($t_y$) taken for increasing the hydrogen concentration in the anode 1 to make the hydrogen concentration of the mixed gas discharged to atmosphere to be, for example, 3.8%, and thus the purge valve 7 may be closed after the lapse of $t_y$ from t4. Here, introduction of air to the cathode 2 at a certain flow rate prior to the time (t4) of hydrogen introduction to the anode 1 enables accurate measurement of the hydrogen concentration and further prevention of flow of air into the cathode 2.

At this point, a signal from the sensor 13 is received by the CPU 11 to measure time.

As just described, the hydrogen in the anode 1 is consumed positively after an operation stop command is received to lower the pressure in the anode 1 compared with the atmospheric pressure, thereby enabling spontaneous flow of air into the anode 1. The lower the pressure the anode 1, in other words, the greater the difference between the pressure in the anode 1 and the atmospheric pressure, the faster the air flows. The pressure in the anode 1 in this state is, as described above, preferably from 0.001 to 0.7 atm, for example. It is more preferably from 0.005 to 0.5 atm. It is even more preferably from 0.01 to 0.3 atm. With a pressure difference to such extent, inside the anode 1 is quickly substituted by air. The time period of combining hydrogen and oxygen is thus reduced as much as possible. This is because production of hydrogen peroxide in the state where hydrogen and oxygen are combined damages the polymer electrolyte membrane 3 and thus it is not preferred, and further, in the state where hydrogen remains in the anode 1 for a longer period, the hydrogen gradually leaks outside the anode 1 and causes loss of hydrogen.

Since the use of a ceramics catalyst for the anode 1 enables inhibition of the generation of a reverse current due to ARSM described above, it is possible to reduce degradation of the Pt/CB catalyst used for the cathode 2.

Further, since both the anode 1 and the cathode 2 are purged with air while the operation of the fuel cell 100 is stopped, it is possible to use, instead of the Pt/CB catalyst, a material not resistant to hydrogen for the cathode 2. For example, in a fuel cell where hydrogen is confined in the anode while the operation is stopped not to substitute the hydrogen by air, when a catalyst using $SnO_2$ as a material not resistant to hydrogen used as the carrier is used for the cathode, the hydrogen in the anode diffuses in the cathode via the electrolyte membrane, resulting in partial reduction of $SnO_2$ to produce Sn. Since the polymer electrolyte membrane is acidic, Sn is eluted to adhere to a transfer path of the protons and on the catalyst. In contrast, in the fuel cell system in the present embodiment, hydrogen is not present in the fuel cell 100 while the operation of the fuel cell 100 is stopped, so that it is possible to use a material not resistant to hydrogen, instead of the conventional Pt/CB catalyst, for the cathode 2. Specifically, it is possible to use, for the cathode, a catalyst with a carrier of metal oxide doped with an impurity having a valence greater than a valence of metal constituting metal oxide subjected to doping, for example a catalyst with a carrier of, in addition to Pt/Nb—$SnO_2$, Pt/Ta—$SnO_2$, and Pt/Sb—$SnO_2$, tungsten oxide base ($WO_3$), indium oxide base ($In_2O_3$—$SnO_2$), vanadium oxide base (VOx), perovskite oxide base ($La_{1-x}Sr_x$)$MO_3$ (M: transition metal), and $Pr_2NiO_4$. These materials are significantly less prone to be corroded, compared with carbon, by exposure to high potential during cell load variation or during start/stop, so that they are more preferred than the conventional Pt/CB catalyst.

Second Embodiment

<Configuration of Fuel Cell System>

Figure 6:
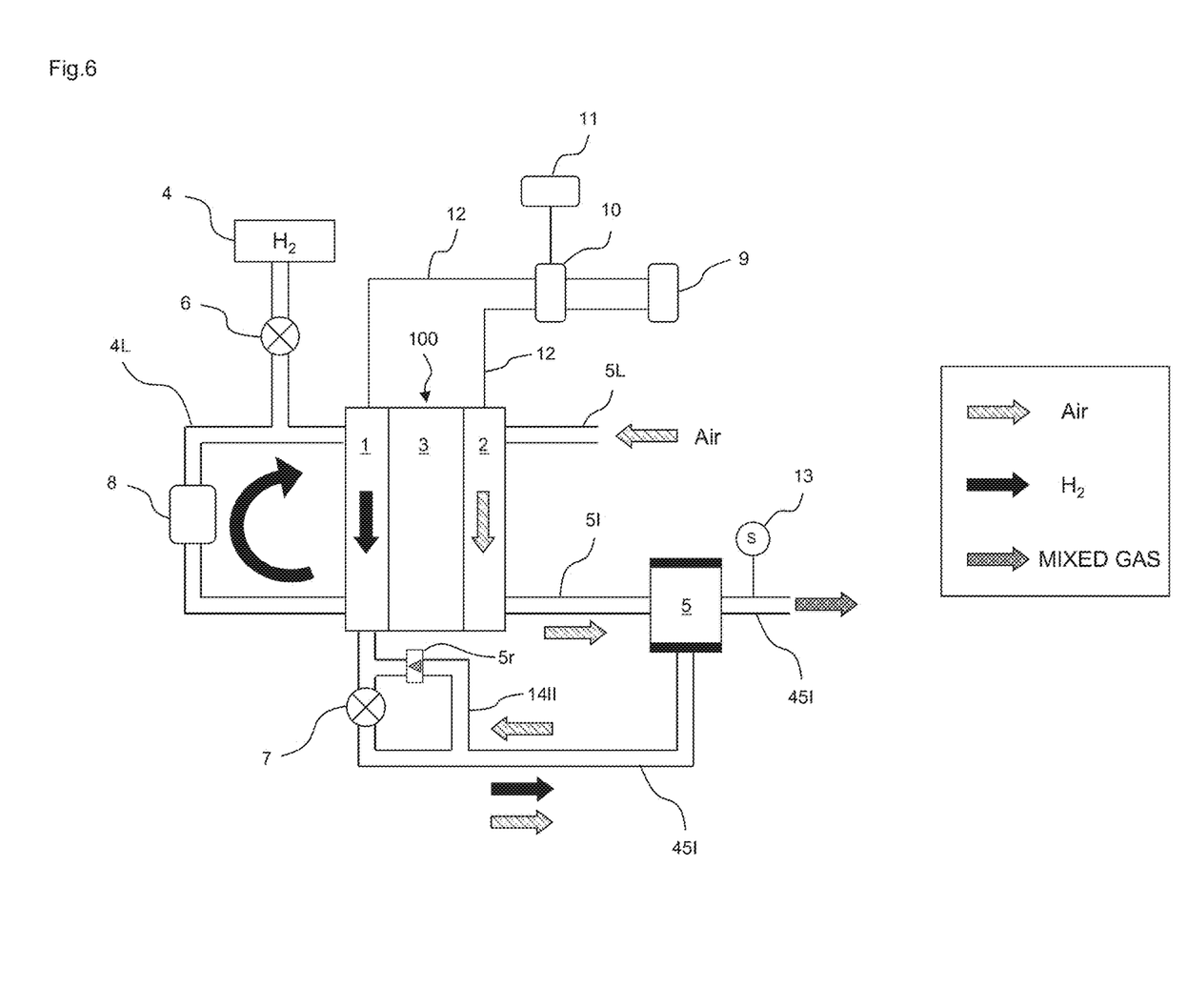
FIG. 6 is a block diagram illustrating a configuration of the fuel cell system according to a second embodiment.

With reference to FIG. 6, a system to operate a fuel cell according to the second embodiment is described. To the components same as those in FIG. 4 for the first embodiment, the same reference signs are given to omit the description. In the second embodiment, in addition to the configuration in the first embodiment, the mixed gas channel 45I is provided with a branched channel 14I across both sides of the purge valve 7, and the branched channel 14I is provided with a check valve 5r to prevent outflow of the gas towards the atmosphere from the fuel gas chamber and to allow flow of the gas towards the fuel gas chamber. The sensor 13 acquires, instead of the hydrogen concentration, an oxygen concentration. When a pressure difference between the mixed gas channel 45I and the anode 1 reaches a predetermined threshold, the check valve 5r is selected to have a threshold that allows introduction of air into the anode 1 through the mixed gas channel 45I.

<Sequence for Operation Stop Command and Restart>

Figure 7:
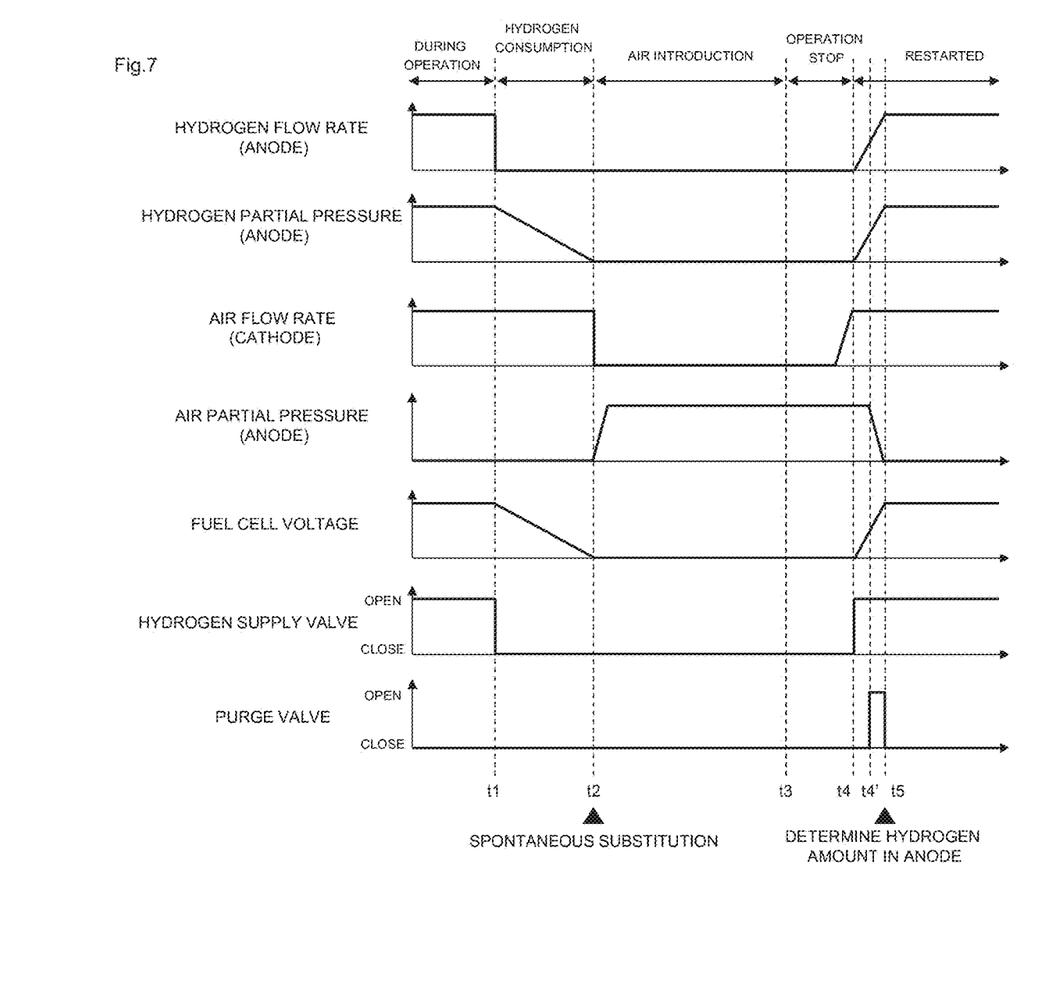
FIG. 7 is a sequence diagram during introduction of air into the fuel cell system according to the second embodiment.

With reference to FIG. 7, control for an operation stop command and restart of the fuel cell system is described. The control is basically same as that in FIG. 5, while the open/close timing of the purge valve 7 is different.

At time t1, an operation stop command of the fuel cell 100 is assumed to be issued. In this state, the hydrogen supply valve 6 is closed to stop the supply of hydrogen to the anode 1, and also the switch 10 is turned into an on-state to turn on the electrical connection of the battery 9 to the anode 1 and the cathode 2. This results in decomposition of the hydrogen remained in the anode 1 and movement of the electrons to the battery 9 via the wiring 12, and the battery 9 stores electricity. Accordingly, the partial pressure of hydrogen and the voltage in the fuel cell 100 in the anode 1 is reduced gradually. Although FIG. 7 shows linear reduction for the convenience of illustration, actual reduction may not be linear as such.

When the partial pressure of hydrogen in the anode 1 is reduced and the pressure difference with the atmospheric pressure exceeds a predetermined value, air spontaneously flows in from atmosphere through the check valve 5r. The predetermined value is, for example, preferably from 0.001 to 0.7 atm. It is more preferably from 0.01 to 0.5 atm. It is even more preferably from 0.1 to 0.3 atm. Specific examples include 0.001, 0.002, 0.003, 0.004, 0.005, 0.006, 0.007, 0.008, 0.009, 0.01, 0.02, 0.03, 0.04, 0.05, 0.06, 0.07, 0.08, 0.09, 0.1, 0.15, 0.2, 0.25, 0.3, 0.35, 0.4, 0.45, 0.5, 0.6, and 0.7 atm, and may be within a range between any two values listed here. That is, the substitution of hydrogen in the anode 1 by air is started by the act of the check valve 5r at time t2, so that there is no need to open the purge valve 7, and accordingly, the control of the purge valve 7 by the CPU 11 and the like are also not required. It is possible to completely consume the small amount of hydrogen remained in the anode 1 by non-generative chemical reaction, which does not generate a reverse current, with the oxygen introduced via the check valve 5r on the anode catalyst. The control after t2 until immediately before t4 is same as that in the first embodiment, so that the description is omitted.

Then, the case of restarting the fuel cell 100 at time t4 is described. Firstly, introduction of air into the cathode 2 is started and assumed to reach a certain flow rate. At this point (t4), the hydrogen supply valve 6 is opened to supply hydrogen into the anode 1. In this state, the purge valve 7 remains closed, and though in a short period of time, the state where oxygen and hydrogen are combined in the anode 1 exists. However, as already described, it is possible to prevent generation of a reverse current due to the ARSM effect of the ceramics catalyst.

When the pressure in the anode 1 reaches a predetermined pressure higher than the atmospheric pressure (t4'), the purge valve 7 is opened to discharge the air remained in the anode 1 at once. Then, at the time (t5) when the air concentration calculate based on the oxygen concentration acquired by the sensor 13 is less than a predetermined value, the purge valve 7 is closed and activation of the circulation pump 8 is started to operation the fuel cell 100. Here, the predetermined value of the air concentration is, for example, 96%. Since the purge valve 7 is closed from time t4 until time t4' and the air thus remains confined, the partial pressure of air is constant from t4 to t4'. The introduction of air into the cathode 2 may be started prior to the introduction of hydrogen into the anode 1 (t4), and in this case, it is possible to measure the hydrogen concentration more accurately and further to prevent flow of air into the cathode 2.

As described above, the air concentration does not have to be acquired by the sensor 13. The temporal variation of the concentration of the air in the anode 1 is obtained from the volume of the hydrogen channel 41 and the charging time that are set in advance to calculate the time ($t_y$) taken for decreasing the air concentration in the anode 1 to make the air concentration of the mixed gas to be from 100% to 96%, and thus the purge valve 7 may be closed after the lapse of $t_y$ from t1.

<Other Aspects of Fuel Cell System>

The descriptions have been given to the fuel cell system using the fuel cell 100 where a ceramics catalyst is used for the anode 1 for positive air substitution while the cell is stopped. In this case, it is possible to inhibit generation of a reverse current and thus a conventional Pt/C catalyst may be used for the cathode catalyst or, instead of the conventional Pt/CB catalyst, a material particularly not resistant to a hydrogen atmosphere diffused and leaked via the polymer electrolyte membrane while the cell is stopped may be used as the catalyst for the cathode. Specifically, it is possible to use, for the cathode 2, a catalyst with a carrier of metal oxide doped with an impurity having a valence greater than a valence of metal constituting metal oxide subjected to doping, for example a catalyst with a carrier of, in addition to Pt/Nb—$SnO_2$, Pt/Ta—$SnO_2$, and Pt/Sb—$SnO_2$, tungsten oxide base ($WO_3$), indium oxide base ($In_2O_3$—$SnO_2$), vanadium oxide base (VOx), perovskite oxide base ($La_{1-x}Sr_x$)$MO_3$ (M: transition metal), and $Pr_2NiO_4$. Meanwhile, a description is given to the case where a conventional Pt/C catalyst is used for the anode 1 and a catalyst with a carrier of, in addition to Pt/Nb—$SnO_2$, Pt/Ta—$SnO_2$, and Pt/Sb—$SnO_2$, tungsten oxide base ($WO_3$), indium oxide base ($In_2O_3$—$SnO_2$), vanadium oxide base (VOx), perovskite oxide base ($La_{1-x}Sr_x$)$MO_3$ (M: transition metal), and $Pr_2NiO_4$ that are not resistant to hydrogen but stable in an oxidizing atmosphere environment is used for the cathode 2. The system configuration and operation are same as those in FIGS. 4 and 5 or FIGS. 6 and 7.

Since hydrogen is excluded from the fuel cell 100 by introduction of air into the anode 1 by receiving the operation stop command of the fuel cell 100, it becomes possible to used, instead of the conventional Pt/CB catalyst, a material not resistant to hydrogen for the cathode. Specifically, it is possible to use, for the cathode 2, a catalyst with a carrier of metal oxide doped with an impurity having a valence greater than a valence of metal constituting metal oxide subjected to doping, for example a catalyst with a carrier of, in addition to Pt/Nb—$SnO_2$, Pt/Ta—$SnO_2$, and Pt/Sb—$SnO_2$, tungsten oxide base ($WO_3$), indium oxide base ($In_2O_3$—$SnO_2$), vanadium oxide base (VOx), perovskite oxide base ($La_{1-x}Sr_x$)$MO_3$ (M: transition metal), and $Pr_2NiO_4$. Here, a ceramics catalyst is not used for the anode 1 and thus there is no ARSM effect as in FIG. 1. However, the catalyst used for the cathode 2 is an oxide and is not oxidized more than the state, so that it is more preferred than the conventional Pt/CB catalyst.

The descriptions have been given above to the fuel cell system and the method of operating the same according to the present embodiment, while they are merely examples and the present invention is not limited to them.

For example, the material may have properties with electric resistance in an oxygen atmosphere greater than electric resistance in a hydrogen atmosphere. The circulation pump 8 and the buffer tank 5 may be omitted. Instead of the battery 9, a resistor may be provided. This converts the electrons moved from the anode 1 into thermal energy, thereby enabling quick consumption of hydrogen in the anode 1. In addition to the purge valve 7, a pump to deliver air into the anode 1 may be provided to quickly substitute hydrogen in the anode 1 by oxygen. Instead of acquiring a hydrogen concentration or an oxygen concentration in the gas passing through the mixed gas channel 45I, a hydrogen concentration or an oxygen concentration in the anode 1 may be acquired by a sensor provided in the anode 1. In preparation for the case where gas flow through the check valve 5r backward, two check valves 5r may be provided in series. Further, in order not to allow backflow of the gas into the anode 1 when the pressure difference between the pressure in the anode 1 and the atmospheric pressure decreases by opening the purge valve 7 for restart of the fuel cell 100, a check valve to prevent inflow of the gas towards the anode 1 from atmosphere may be provided in the mixed gas channel 45I on the atmosphere side from the purge valve 7. Further, the oxygen concentration may be acquired by the sensor 13 in the first embodiment, and the hydrogen concentration may be acquired by the sensor 13 in the second embodiment.

REFERENCE SIGNS LIST

1: anode, 2: cathode, 3: polymer electrolyte membrane, 4: hydrogen tank, 4I: hydrogen channel, 5: buffer tank, 5I: oxygen channel, 5r: check valve, 45I: mixed gas channel, 6: hydrogen supply valve, 7: purge valve, 8: circulation pump, 11: CPU, 10: switch, 9: battery, 12: wiring, 13: sensor, 14I: branched channel, 100: fuel cell.

What is claimed is:

1. A fuel cell system comprising:
a fuel cell having a catalyst used for an anode, wherein a carrier of the catalyst is composed of a material with a property where electric resistance in an oxygen containing atmosphere is greater than electric resistance in a hydrogen atmosphere;
a control device configured to control the fuel cell, when supply of fuel gas is stopped during stoppage of operation of the fuel cell, to consume all or part of the fuel gas in a fuel gas chamber, followed by introducing oxygen containing gas into the fuel gas chamber; and
a valve provided in a channel in communication with the fuel gas chamber and open to atmosphere,
wherein air as the oxygen containing gas is controlled to be introduced into the fuel gas chamber by opening the valve by the control device when a pressure in the fuel gas chamber is lower than an atmospheric pressure.

2. The fuel cell system according to claim 1, wherein the control device configured to control the air, by opening the valve when the fuel cell is restarted, to be pushed out with the fuel gas introduced into the fuel gas chamber for discharge of the air to the atmosphere.

3. The fuel cell system according to claim 1, wherein the control device configured to control, when an air concentration in gas passing through the channel open to the atmosphere is less than a predetermined value after the fuel cell is restarted, the valve to be closed to start power generation.

4. The fuel cell system according to claim 1, wherein the control device configured to control, when a hydrogen concentration in gas passing through the channel open to the atmosphere is more than a predetermined value after the fuel cell is restarted, the valve to be closed.

5. The fuel cell system according to claim 1, wherein the channel in communication with the fuel gas chamber and open to atmosphere is connected to a branched channel provided across both sides of the valve and
the branched channel is provided with a check valve to prevent outflow of gas towards the atmosphere from the fuel gas chamber.

6. The fuel cell system according to claim 1, wherein the material is any one of metal oxide, metal nitride, and metal carbide doped with an impurity having a valence greater than a valence of metal constituting a metal compound subjected to doping.

7. A fuel cell system comprising:
a fuel cell having a catalyst used for a cathode, wherein a carrier of the catalyst is composed of metal oxide doped with an impurity having a valence greater than a valence of metal constituting metal oxide subjected to doping;
a control device configured to control the fuel cell, when supply of fuel gas is stopped during stoppage of operation of the fuel cell, to consume all or part of the fuel gas in a fuel gas chamber, followed by introducing oxygen containing gas into the fuel gas chamber; and
a valve provided in a channel in communication with the fuel gas chamber and open to atmosphere,
wherein air as the oxygen containing gas is controlled to be introduced into the fuel gas chamber by opening the valve by the control device when a pressure in the fuel gas chamber is lower than an atmospheric pressure.

8. The fuel cell system according to claim 7, wherein the metal oxide is at least one selected from tin oxide, titanium oxide, tungsten oxide, indium oxide, vanadium oxide, and perovskite oxide.

9. A method of operating a fuel cell system, comprising:
controlling, when supply of fuel gas is stopped during stoppage of operation of a fuel cell, the fuel cell to consume all or part of the fuel gas in a fuel gas chamber, followed by introducing oxygen containing gas into the fuel gas chamber,
providing a valve in a channel in communication with the fuel gas chamber and open to atmosphere,
wherein air as the oxygen containing gas is controlled to be introduced into the fuel gas chamber by opening the valve by the control device when a pressure in the fuel gas chamber is lower than an atmospheric pressure,
wherein the fuel cell has a catalyst used for an anode, and a carrier of the catalyst is composed of a material with a property where electric resistance in an oxygen containing atmosphere is greater than electric resistance in a hydrogen atmosphere.

* * * * *